(12) United States Patent
Zhao et al.

(10) Patent No.: US 12,360,266 B2
(45) Date of Patent: Jul. 15, 2025

(54) ACOUSTIC TRANSDUCER WITH PIEZOELECTRIC ELEMENTS HAVING DIFFERENT POLARITIES

(71) Applicant: Halliburton Energy Services, Inc., Houston, TX (US)

(72) Inventors: Jiajun Zhao, Houston, TX (US); Jing Jin, Singapore (SG); Ruijia Wang, Singapore (SG); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 975 days.

(21) Appl. No.: 17/474,662

(22) Filed: Sep. 14, 2021

(65) Prior Publication Data
US 2023/0094543 A1 Mar. 30, 2023

(51) Int. Cl.
| | |
|---|---|
| *B06B 1/06* | (2006.01) |
| *G01V 1/00* | (2006.01) |
| *G01V 1/42* | (2006.01) |
| *G01V 1/46* | (2006.01) |

(52) U.S. Cl.
CPC ............ *G01V 1/001* (2013.01); *B06B 1/0603* (2013.01); *G01V 1/42* (2013.01); *G01V 1/46* (2013.01)

(58) Field of Classification Search
CPC .......................... B06B 1/0603; H10N 30/204
USPC ................................. 310/328, 330, 322, 334
See application file for complete search history.

(56) References Cited

U.S. PATENT DOCUMENTS

| | | | |
|---|---|---|---|
| 5,815,466 A | 9/1998 | Erath | |
| 9,541,657 B2 | 1/2017 | Mandal et al. | |
| 10,293,376 B2 | 5/2019 | Jin et al. | |
| 2005/0152219 A1 | 7/2005 | Garcia-Osuna et al. | |
| 2007/0226974 A1* | 10/2007 | Li | B41J 2/055 29/25.35 |
| 2010/0165794 A1 | 7/2010 | Takahashi et al. | |
| 2013/0293065 A1* | 11/2013 | Hajati | B06B 1/0629 310/334 |
| 2016/0288167 A1* | 10/2016 | Jin | G01V 1/46 |

FOREIGN PATENT DOCUMENTS

JP    2019216203 A    12/2019

OTHER PUBLICATIONS

Foreign Communication from Related Application—International Search Report and Written Opinion of the International Searching Authority, International Application No. PCT/US2021/050795, dated May 24, 2022, 11 pages.

(Continued)

*Primary Examiner* — Derek J Rosenau
(74) *Attorney, Agent, or Firm* — Conley Rose, P.C.; Rodney B. Carroll

(57) ABSTRACT

An acoustic transducer includes a substrate element having a first side, and a second side opposite the first side. The acoustic transducer also includes first and second piezoelectric elements coupled to the first side, and third and fourth piezoelectric elements coupled to the second side. The first piezoelectric element has a first polarity, and the second piezoelectric element has a second polarity different than the first polarity. The third piezoelectric element has a third polarity, and the fourth piezoelectric element has a fourth polarity different than the third polarity.

20 Claims, 8 Drawing Sheets

(56) References Cited

OTHER PUBLICATIONS

Electronic Filing Receipt, Specification and Drawings for International Application No. PCT/US2021/050795, entitled "Acoustic Transducer with Piezoelectric Elements Having Different Polarities," filed Sep. 17, 2021, 43 pages.

* cited by examiner

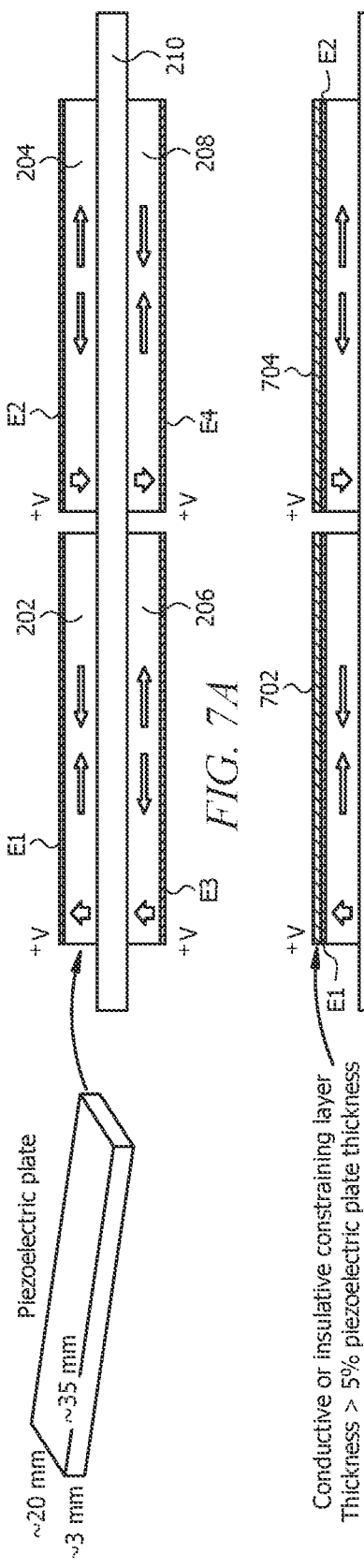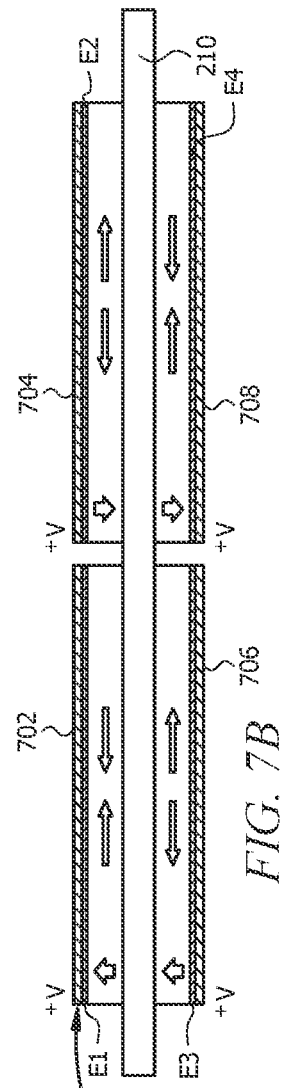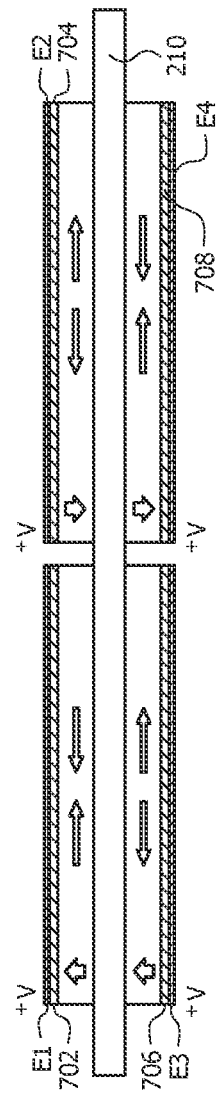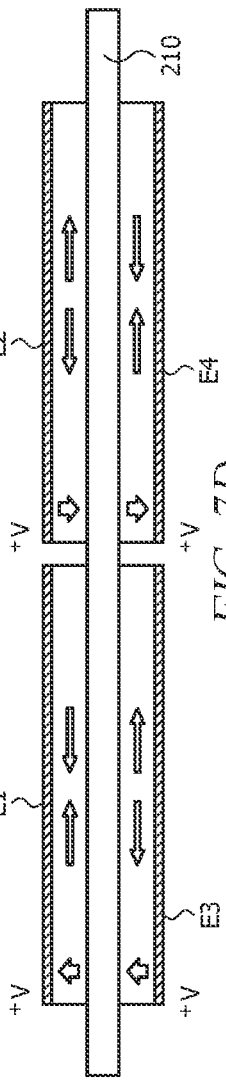
FIG. 7A
FIG. 7B
FIG. 7C
FIG. 7D

… (1)

ACOUSTIC TRANSDUCER WITH PIEZOELECTRIC ELEMENTS HAVING DIFFERENT POLARITIES

TECHNICAL FIELD

This present disclosure relates generally to acoustic logging. In particular, embodiments herein are related to bender bar transducers.

BACKGROUND

An acoustic logging tool used in a subterranean drilling operation typically includes an acoustic source (transmitter), and a set of receivers that are spaced several inches or feet apart. The logging tool may be lowered into a borehole in a subterranean formation by a wireline or conventional drilling assembly, for example, where it may transmit an acoustic signal from the acoustic source and receive the signal or its echo at the receivers of the tool. Bender bars have been utilized in wireline tools to either detect or to generate acoustic vibrations. However, bender bars can be limited in the amount of acoustic pressure or energy that they can produce.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 7A-7D are diagrams illustrating various electrode and/or constraining layer configurations of bender bar transducers according to embodiments of the present disclosure.

DETAILED DESCRIPTION

Figure 1A:
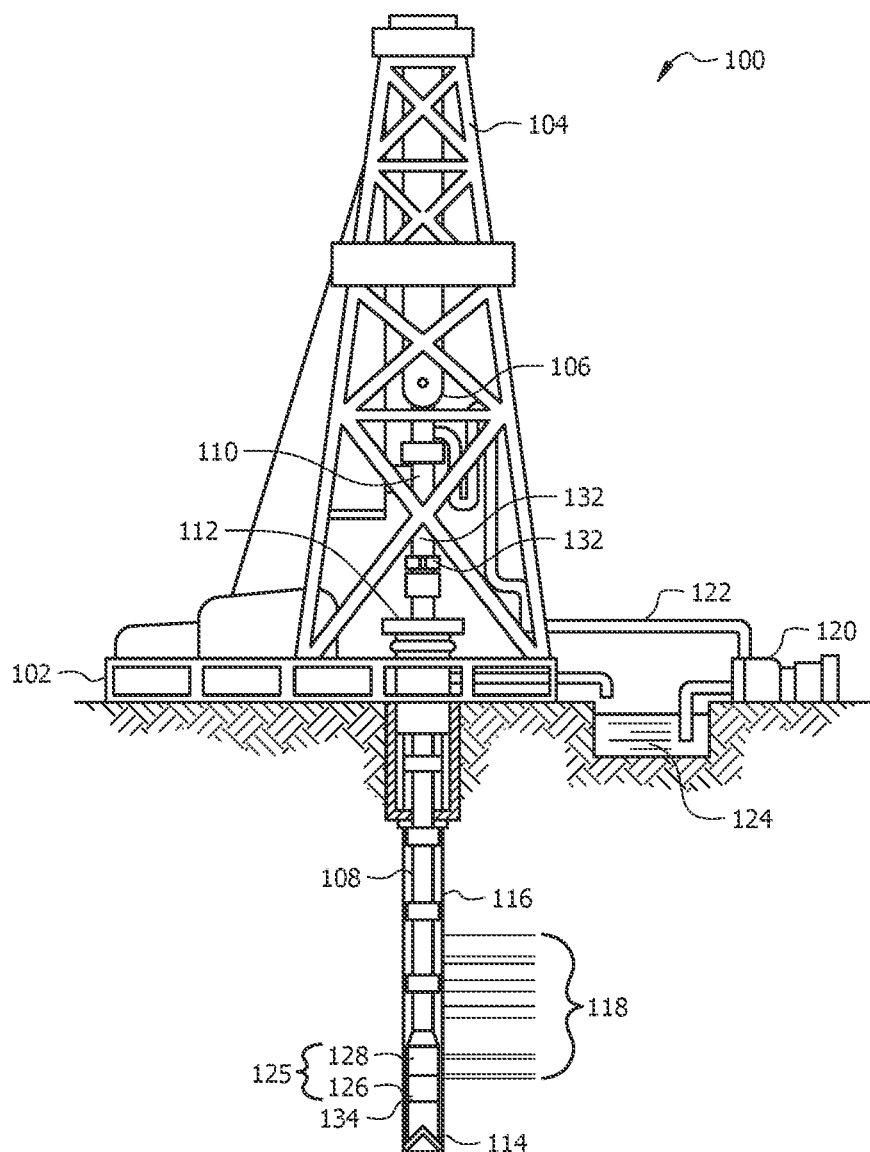
FIG. 1A is a diagram illustrating an exemplary environment for using acoustic transducers according to the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Illustrative embodiments and related methodologies of the present disclosure are described below as they might be employed in a bender bar having improved acoustic pressure and energy output. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

Disclosed herein is an acoustic transducer, such as a bender bar, which includes a substrate having a first side and a second side, which is opposite the first side. The acoustic transducer also includes first, second, third, and fourth piezoelectric elements coupled to the substrate. The first and second piezoelectric elements are coupled to the first side of the substrate, while the third and fourth piezoelectric elements are coupled to the second side of the substrate. In an example, the first and second piezoelectric elements have different polarities, while the third and fourth piezoelectric elements also have different polarities.

In such an acoustic transducer, the piezoelectric elements expand or contract responsive to a voltage signal being applied to the piezoelectric elements (e.g., outer-facing electrodes of the elements), and the polarity or polarization direction of the particular piezoelectric element. The expansion and contraction of the piezoelectric elements impart stresses to the underlying substrate, which cause the substrate to bend accordingly. As a result, the bender bar vibrates at a frequency in the range of the applied voltage signal.

In some cases, it is useful to enhance or amplify asymmetric resonant modes of the acoustic transducer. Further, it can be useful to achieve a flatter, or less variable frequency response across a broad range of frequencies, such as from about 1 kilohertz (kHz) to 20 kHz, and higher.

Examples described herein address the foregoing by providing acoustic transducers, systems, and methods in which multiple piezoelectric elements on a same side of the substrate have different polarization directions (e.g., polarities). The piezoelectric elements on one side of the substrate are insulated from each other, such as by an air gap between the piezoelectric elements. Accordingly, a same voltage signal applied to each piezoelectric element on the same side of the substrate results in different behavior. For example, in response to the same voltage signal, one piezoelectric element contracts, while another piezoelectric element on the same side of the substrate expands. Because a same voltage signal is applied to the piezoelectric elements on the substrate, a voltage supply or source is simplified as compared to systems in which different voltage signals are simultaneously provided to the piezoelectric elements.

Because the piezoelectric elements on the same side of the substrate have opposite stresses (e.g., one contracts, while the other expands) responsive to receiving a same voltage signal, asymmetric modes are enhanced, while certain symmetric modes (e.g., the first resonant mode) are suppressed. In some examples, a flatter frequency response results due to the suppression of symmetric modes and enhancement of asymmetric modes. Additionally, the acoustic transducers described herein may be more mechanically robust, because splitting the piezoelectric elements on either side of the substrate reduces the risk of element and/or bonding material (e.g., glue) breakage in response to certain resonant modes of the bender bar (e.g., substrate). These and other examples are described in further detail below, with reference made to the accompanying figures.

The acoustic transducers described herein can be employed in an exemplary wellbore operating environment 100 shown, for example, in FIG. 1A. FIG. 1A illustrates a schematic view of a wellbore operating environment 100 in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various subterranean formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

In examples of this description, the drill string 108 can include an acoustic logging tool 126, such as a logging tool 126 utilizing a bender bar acoustic transducer as described herein, such as bender bar transducer 200 described further below. The acoustic logging tool 126 can be integrated into a bottom-hole assembly (BHA) 125 near drill bit 114 for carrying out measure while drilling (MWD) or logging while drilling (LWD) operations.

As the drill bit 114 extends the wellbore 116 through the formations 118, the logging tool 126 collects acoustic measurement signals relating to various formation properties, such as formation slowness (e.g., the inverse of acoustic speed) and anisotropy, from which pore pressure, porosity, and other formation property determinations can be made. In some examples, the logging tool 126 is configured to collect acoustic signals useful to image the formation 118. In some examples, the logging tool 126 is configured to collect acoustic measurement signals useful to determine the tool orientation and various other drilling conditions. The logging tool 126 can take the form of a drill collar (e.g., a thick-walled tubular that provides weight and rigidity to aid the drilling process).

The BHA 125 may also include a telemetry sub 128 to transfer measurement data (e.g., images and/or measurement data/signals) to a surface receiver 132 and to receive commands from the surface. In at least some cases, the telemetry sub 128 communicates with a surface receiver 132 using mud pulse telemetry. In some cases, the telemetry sub 128 does not communicate with the surface, but rather stores logging data for later retrieval at the surface when the logging assembly is recovered.

Logging tool 126 may include a system control center ("SCC"), along with necessary processing/storage/communication circuitry, that is communicably coupled to one or more acoustic transmitters and/or receivers (not shown) utilized to acquire formation measurement signals reflecting formation parameters. In some examples, once the measurement signals are acquired, the SCC calibrates the measurement signals and communicates the data back uphole and/or to other assembly components via telemetry sub 128. In some examples, the SCC may be located at a remote location away from logging tool 126, such as the surface or in a different borehole, and performs the processing accordingly. These and other variations within the present disclosure will be readily apparent to those ordinarily skilled in the art having the benefit of this disclosure.

Each of the one or more logging tools 126 may include one or more tool components spaced apart from each other and communicatively coupled by one or more wires and/or other media for LWD and MWD operations. The logging tools 126 may also include one or more computing devices 134 communicatively coupled with one or more of the tool components by one or more wires and/or other media. The one or more computing devices 134 may be configured to control or monitor a performance of the tool, process logging data, and/or carry out one or more aspects of the methods and processes of the present disclosure.

In at least one example, one or more of the logging tools 126 may communicate with a surface receiver 132 by a wire, such as wired drill pipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drill pipe.

Figure 1B:
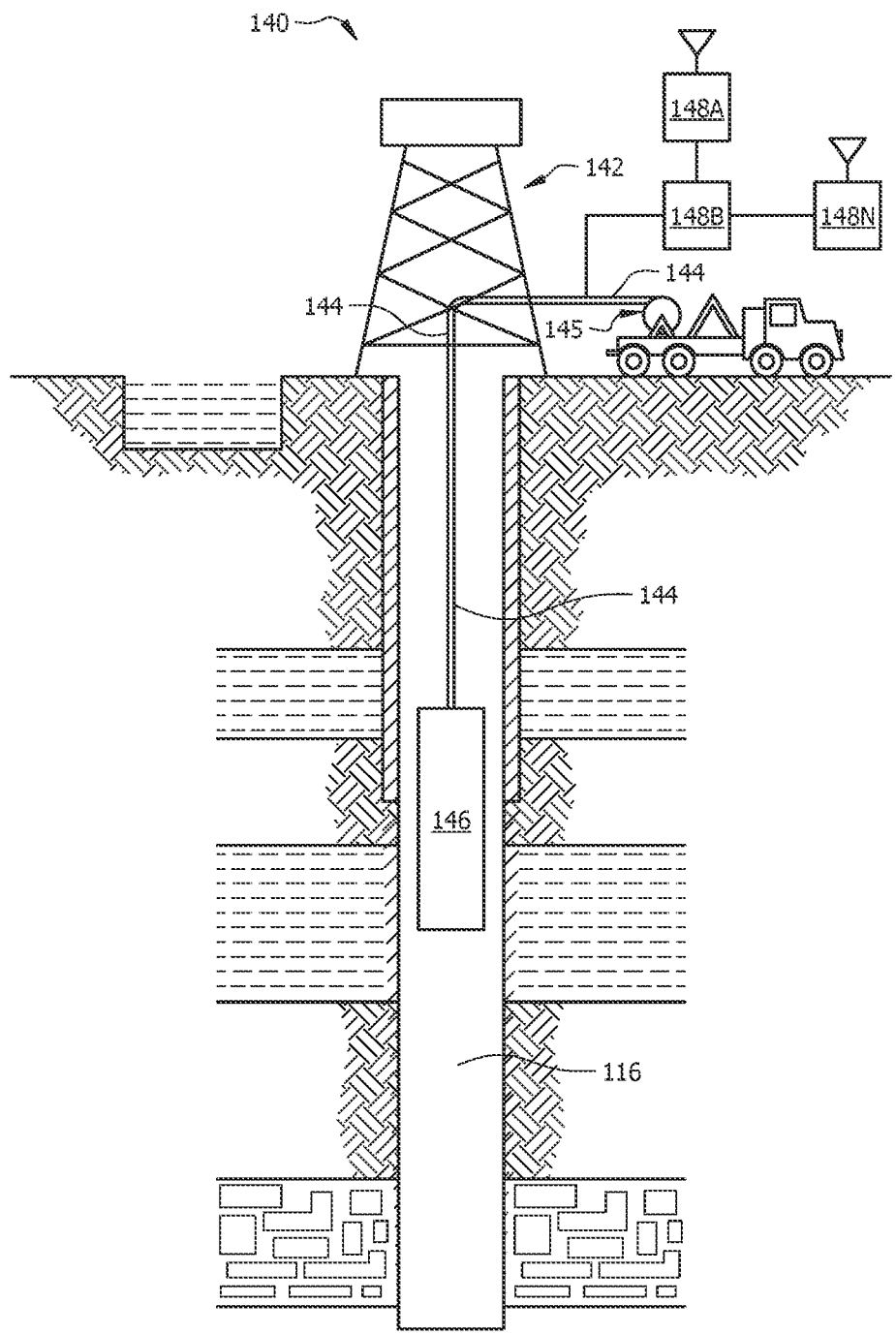
FIG. 1B is a diagram illustrating another exemplary environment for using acoustic transducers according to the present disclosure.

FIG. 1B illustrates an embodiment in which an acoustic transducer is utilized in a wireline application. In FIG. 1B, an example system 140 includes a tool having a tool body 146 in order to carry out logging and/or other operations. The tool body 146 may be or include the logging tool 126, utilizing a bender bar acoustic transducer as described herein, such as bender bar transducer 200, described further below. In this environment, rather than using a drill string 108 of FIG. 1A to lower tool body 146 and which can contain sensors and/or other instrumentation for detecting and logging nearby characteristics and conditions of the wellbore 116 and surrounding formations, the drill string 108 can be withdrawn and a conduit 144 employed (referred to as "wireline"). The tool body 146 can include an acoustic logging tool. The tool body 146 can be lowered into the wellbore 116 by conduit 144. The conduit 144 can be anchored in the drill rig 145 or by a portable means such as a truck. The conduit 144 can include one or more wires, slicklines, cables, and/or the like, as well as tubular conduits such as coiled tubing, joint tubing, or other tubulars.

The illustrated conduit 144 provides power and support for the tool, as well as enabling communication between tool processors 148A-N on the surface. In some examples, the conduit 144 can include electrical and/or fiber optic cabling for carrying out communications. The conduit 144 is sufficiently strong and flexible to tether the tool body 146 through the wellbore 116, while also permitting communication through the conduit 144 to one or more processors 148A-N, which can include local and/or remote processors. Moreover, power can be supplied via the conduit 144 to meet power requirements of the tool. For slickline or coiled tubing configurations, power can be supplied downhole with a battery or via a downhole generator.

It should be noted that while FIGS. 1A and 1B generally depict a land-based operation, the principles described herein are equally applicable to operations that employ floating or sea-based platforms and rigs, without departing from the scope of the disclosure. Also, even though FIGS. 1A and 1B depict a vertical wellbore, the present disclosure is equally well-suited for use in wellbores having other orientations, including horizontal wellbores, slanted wellbores, multilateral wellbores or the like.

Figure 2:
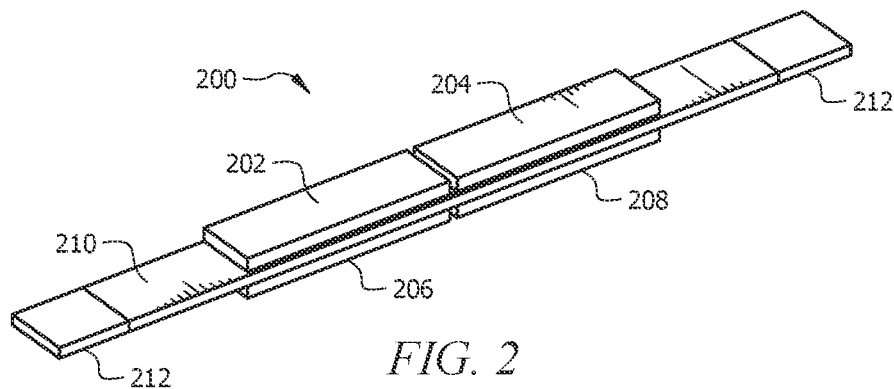
FIG. 2 is a diagram illustrating a bender bar transducer, according to the present disclosure.

FIG. 2 is a diagram illustrating a bender bar transducer 200, in accordance with some embodiments. As shown in FIG. 2, bender bar transducer 200 includes piezoelectric elements 202, 204, 206, 208 coupled to a non-piezoelectric element 210. The non-piezoelectric element 210 may be a substrate 210 and may have fixed ends 212 (e.g., the fixed ends 212 are attached to a supporting structure, not shown for simplicity).

The substrate 210 includes a first side and a second side, which is opposite the first side. In the example of FIG. 2, the piezoelectric elements 202, 204 (e.g., first and second piezoelectric elements, respectively) are coupled to the first side of the substrate 210, while the piezoelectric elements 206, 208 (e.g., third and fourth piezoelectric elements, respectively) are coupled to the second side of the substrate 210.

In an example, the piezoelectric elements 202, 204, 206, 208 can be coupled to the substrate 210 using bonding, affixing, and the like, such that piezoelectric elements 202, 204, 206, 208 share an electrical ground at the surfaces bonded to the substrate 210.

In an example, the piezoelectric elements 202, 204, 206, 208 are formed of piezoelectric material, and the transducer 200 includes a corresponding electrode (or set of electrodes) E1, E2, E3, E4, respectively. The electrodes E1-E4 can be added or otherwise applied to the outer surfaces (e.g., the surfaces facing away from the substrate 210) of the piezoelectric material during manufacture. The electrodes E1-E4 are configured to receive a voltage signal and to produce an electric field in the piezoelectric material responsive to the received voltage signal.

In some examples, the electrodes E1 and E2 are combined into a single electrode for the piezoelectric elements 202, 204 on the first side of the substrate 210, while the electrodes E3 and E4 are combined into a single electrode for the piezoelectric elements 206, 208 on the second side of the substrate 210. In other examples, the electrodes E1 and E2 are physically separate, but receive a same voltage signal, while the electrodes E3 and E4 are also physically separate, but receive a same voltage signal. In still other examples, the electrodes E1, E2, E3, E4 are all physically separate, but receive a same voltage signal.

As described further below, the first piezoelectric element 202 has a first polarity, while the second piezoelectric element 204 has a second polarity. In an example of this description, the second polarity is different than the first polarity. Similarly, the third piezoelectric element 206 has a third polarity, while the fourth piezoelectric element 208 has a fourth polarity. In an example of this description, the fourth polarity is different than the third polarity.

Figure 3:
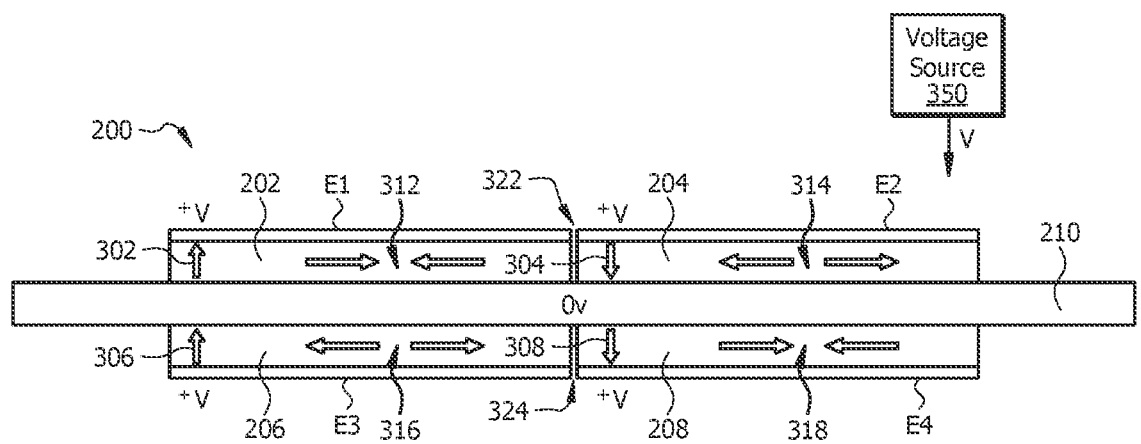
FIG. 3 is diagram illustrating a cross-section of a bender bar transducer having four piezoelectric elements, according to the present disclosure.

FIG. 3 is side view of the bender bar transducer 200 of FIG. 2. In FIG. 3, the electrodes E1-E4 are depicted on the outer surfaces (e.g., the surfaces facing away from the substrate 210) of the piezoelectric elements 202, 204, 206, 208, respectively.

As shown in FIG. 3, on a first side of the substrate 210, the first piezoelectric element 202 is polarized in a first direction (e.g., has a first polarity) away from the substrate 210, shown by arrow 302. Also on the first side of the substrate 210, the second piezoelectric element 204 is polarized in a second direction (e.g., has a second polarity) toward the substrate 210, shown by arrow 304. On the other side of the substrate 210, the third piezoelectric element 206 is polarized in a third direction (e.g., has a third polarity) toward the substrate 210, shown by arrow 306. Also on the other side of the substrate 210, the fourth piezoelectric element 208 is polarized in a fourth direction (e.g., has a fourth polarity) away from the substrate 210, shown by arrow 308.

In other examples, the polarities of the piezoelectric elements 202, 204, 206, 208 can be different than shown in FIG. 3. For example, each of the arrows 302, 304, 306, 308 can be reversed. Irrespective of the particular polarities of the piezoelectric elements 202, 204, 206, 208, the first and second piezoelectric elements 202, 204 have different polarities, while the third and fourth piezoelectric elements 206, 208 have different polarities. In some examples, the first and fourth piezoelectric elements 202, 208 have the same polarity (e.g., away from the substrate 210 as shown in FIG. 3), while the second and third piezoelectric elements 204, 206 have the same polarity (e.g., toward the substrate 210 as shown in FIG. 3).

In an example, a single voltage source 350 provides a same voltage signal V to the electrodes (e.g., electrodes E1-E4, regardless of whether those electrodes are physically separated from each other) on the outer surfaces of the piezoelectric elements 202, 204, 206, 208. Responsive to receiving the voltage signal V, a first piezoelectric stress, indicated by arrows 312, is induced in the first piezoelectric element 202; a second piezoelectric stress, indicated by arrows 314, is induced in the second piezoelectric element 204; a third piezoelectric stress, indicated by arrows 316, is induced in the third piezoelectric element 206; and a fourth piezoelectric stress, indicated by arrows 318, is induced in the fourth piezoelectric element 208. In the particular example of FIG. 3, responsive to the induced stresses, the first and fourth piezoelectric elements 202, 208 contract, while the second and third piezoelectric elements 204, 206 expand. The expansion and contraction of the piezoelectric elements 202, 204, 206, 208 over time causes the substrate 210 to bend, and thus vibrate at the frequency of the alternating current (AC) voltage V.

In an example, an insulator is provided between the piezoelectric elements on a same side of the substrate. For example, a first insulator 322 is provided between the first and second piezoelectric elements 202, 204 on a first side of the substrate 210, while a second insulator 324 is provided between the third and fourth piezoelectric elements 206, 208 on a second side of the substrate 210. The insulators 322, 324 extend completely between the piezoelectric elements, and thus provide a physical and/or electrical separation between the piezoelectric elements on the same side of the substrate 210. In one example, the insulators 322, 324 are air gaps.

In some cases, it is difficult if not impossible to fabricate a single piezoelectric element having different polarities (e.g., the piezoelectric element is a monolithic structure capable of one polarity throughout). Thus, by providing the insulators 322, 324, multiple piezoelectric elements can be disposed on one side of the substrate 210 (e.g., first and second piezoelectric elements 202, 204 on a first side, and third and fourth piezoelectric elements 206, 208 on a second side), and having different polarities from each other. Additionally, by physically separating the piezoelectric elements on a same side of the substrate 210, additional flexibility of the substrate 210 is enabled (e.g., in the vertical direction in FIG. 3), while reducing the risk of damaging the piezoelectric elements 202, 204, 206, 208 and/or bonding material(s) that adhere the piezoelectric elements 202, 204, 206, 208 to the substrate 210.

As described above, the single voltage source 350 is coupled to the bender bar transducer 200, and provides a same voltage signal V to the electrodes (e.g., electrodes E1-E4, regardless of whether those electrodes are physically separated from each other) on the outer surfaces of the piezoelectric elements 202, 204, 206, 208. When the voltage signal V is provided to the piezoelectric elements 202, 204, 206, 208, in the example of FIG. 3, the piezoelectric element 202 contracts, while the opposing piezoelectric element 206 expands. Similarly, the piezoelectric element 204 expands, while the opposing piezoelectric element 208 contracts. The vibration of the substrate 210 that results from such induced stresses on the piezoelectric elements 202, 204, 206, 208 may tend to excite asymmetric resonant modes (e.g., a second mode, a fourth mode, etc.) and suppress or otherwise mitigate symmetric resonant modes (e.g., a first mode, a third mode, etc.). By enhancing asymmetric resonant modes relative to conventional bender bar arrangements, an overall frequency response of the bender bar transducer 200 described herein may be flattened, or otherwise smoothed.

Figure 4A:
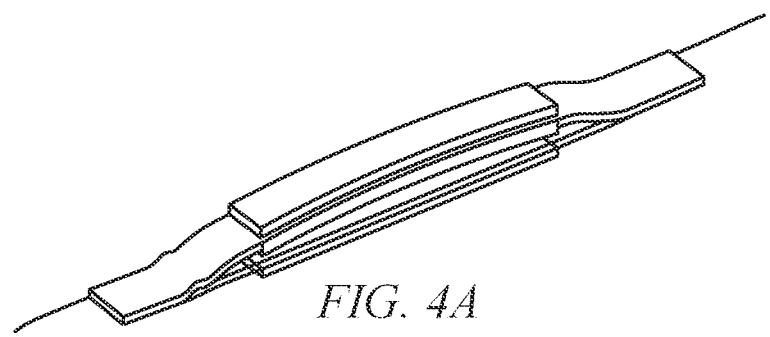
FIGS. 4A-4C are diagrams illustrating resonant modes of a bender bar, according to embodiments of the present disclosure.
Figure 4B:
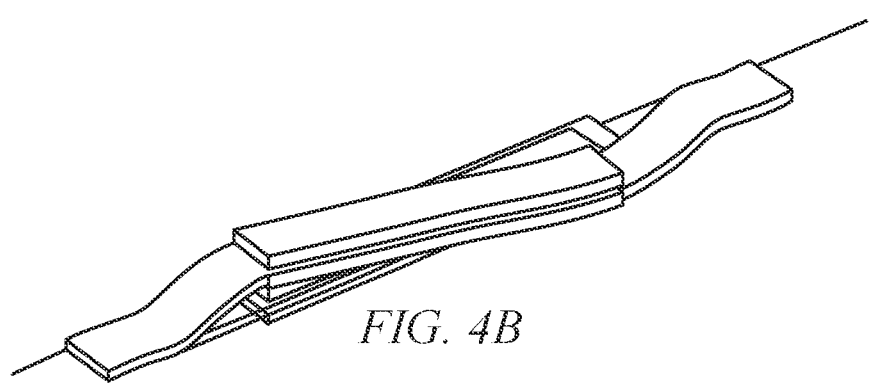
Figure 4C:
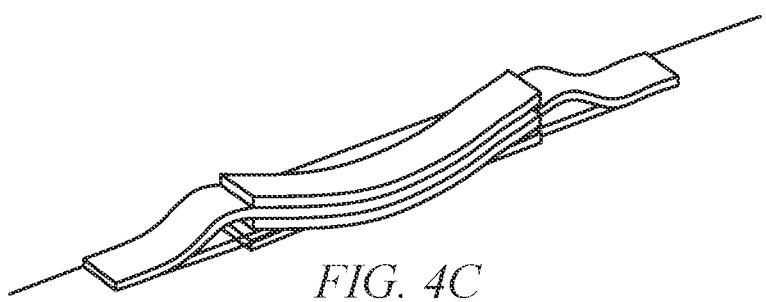

FIGS. 4A-4C are diagrams illustrating resonant modes of bender bar transducer 200, consistent with some examples. As shown in FIGS. 4A and 4C, applying AC voltage V to the electrodes of each piezoelectric element 202, 204, 206, 208 drives the substrate 210 to bend sufficiently to cause bender bar 200 to vibrate at the first (FIG. 4A) and third (FIG. 4C) resonant modes (e.g., symmetric resonances) associated with the frequency of AC voltage V as bender bar transducer 200 vibrates. In some cases, the symmetric resonances have fundamental resonant frequencies that are lower than a desired frequency range of interest, such as approximately 1.5 kHz-10 kHz. The bender bar structure (e.g., the substrate 210 and the piezoelectric elements 202, 204, 206, 208) can be shortened in length to increase its resonant frequency; however, the generated sound pressure level (SPL) is diminished responsive to the decrease in bender bar length, which is not desirable in some cases.

FIG. 4B demonstrates a second resonant mode of the bender bar transducer 200, which is an asymmetric resonant mode. In conventional bender bar transducers, the second resonant mode is difficult to excite due to single piezoelectric elements on either side of the substrate, which tend to excite symmetric resonant modes such as those shown in FIGS. 4A and 4C. Further, to generate asymmetric resonances, conventional bender bar transducers require complex voltage source control, difficult electrical signal isolation, and the like to induce differing stresses in piezoelectric elements on a same side of the substrate. Accordingly, conventional bender bar transducers fail to adequately excite asymmetric resonant modes, such as the second resonant mode in FIG. 4B, by providing a single voltage signal to the piezoelectric elements on the substrate. Moreover, because the second resonant mode (FIG. 4B) is not easily produced, conventional bender bar transducers do not generate much if any acoustic energy or pressure from the second resonant mode, which results in a frequency response having peaks around the first (FIG. 4A) and third (FIG. 4C) resonant modes. For example, there is a wide gap between the frequency of the first resonant mode and the third resonance, and thus conventional bender bar transducers provide reduced amounts of acoustic energy or pressure, which limits their usefulness as acoustic transducers.

The bender bar transducer 200 described herein addresses the foregoing deficiencies of conventional bender bar by providing piezoelectric elements on the same side of the substrate 210 that have different polarities. Accordingly, in response to receiving a same voltage signal, the piezoelectric elements on the same side of the substrate 210 have opposite stresses (e.g., one contracts, while the other expands), and thus asymmetric modes are enhanced, while certain symmetric modes (e.g., the first resonant mode) are suppressed.

As described in FIG. 3, the single voltage source 350 provides a same voltage signal V (e.g., an AC voltage signal) to the electrodes on the outer surfaces of the piezoelectric elements 202, 204, 206, 208. Because of the different polarities of the piezoelectric elements 202, 204, 206, 208 described above, when the voltage signal V is provided to the piezoelectric elements 202, 204, 206, 208, in the example of FIG. 3, the piezoelectric element 202 contracts, while the opposing piezoelectric element 206 expands. Similarly, the piezoelectric element 204 expands, while the opposing piezoelectric element 208 contracts. The vibration of the substrate 210 that results from such induced stresses on the piezoelectric elements 202, 204, 206, 208 may tend to excite asymmetric resonant modes (e.g., FIG. 4B) and suppress or otherwise mitigate symmetric resonant modes (e.g., FIGS. 4A and 4C). In an example, the asymmetric resonant modes are asymmetric with respect to a central plane that passes between the first and second piezoelectric elements 202, 204, and that also passes between the third and fourth piezoelectric elements 206, 208. By enhancing asymmetric resonant modes relative to conventional bender bar arrangements, an overall frequency response of the bender bar transducer 200 described herein may be flattened, or otherwise smoothed.

Figure 5:
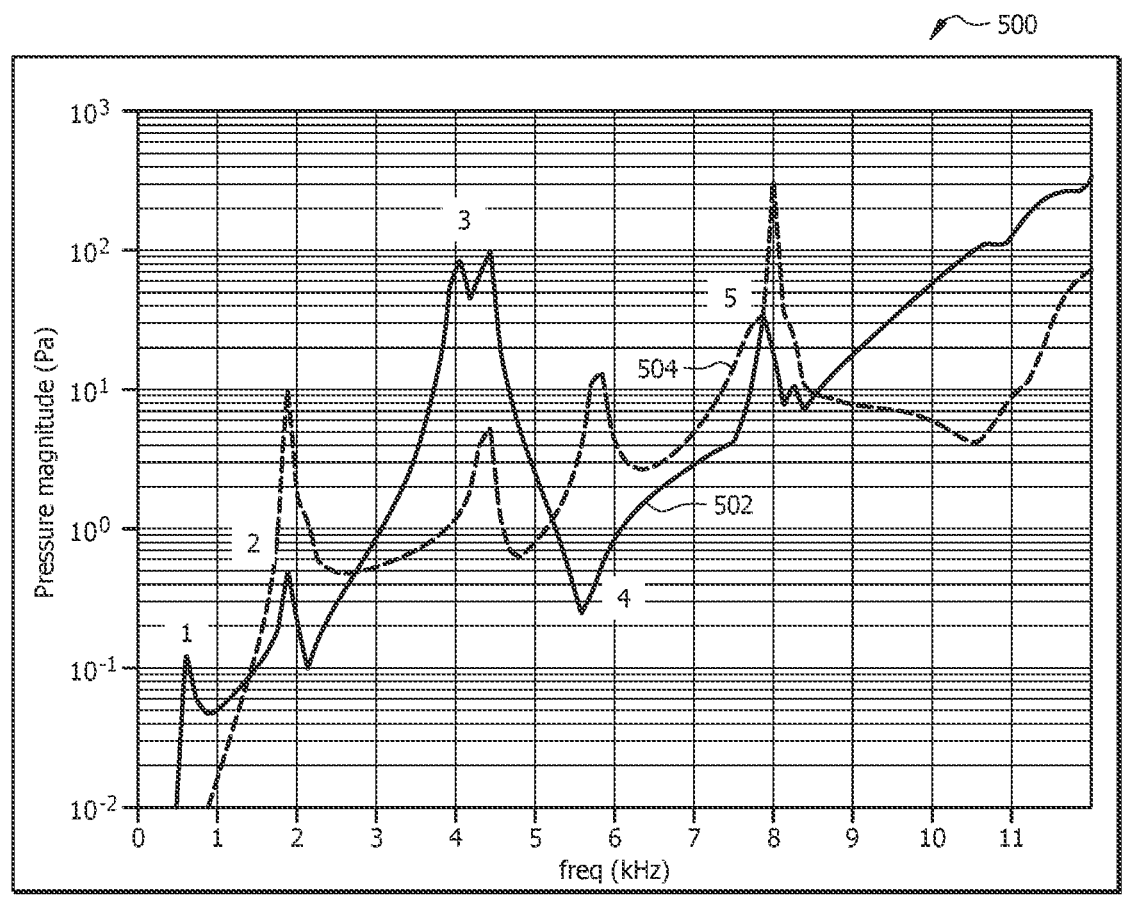
FIG. 5 is a graph comparing frequency responses of a conventional bender bar transducer with a bender bar transducer having physically separate piezoelectric elements on either side of a substrate, according to embodiments of the present disclosure.

FIG. 5 is a graph 500 comparing frequency responses of a conventional bender bar transducer (502) with a bender bar transducer having physically separate piezoelectric elements on either side of a substrate (504), according to embodiments of the present disclosure. The frequency responses 502, 504 shown in the graph 500 are shown in units of Pascals (Pa) as a function of frequency, ranging from approximately 500 hertz (Hz) to 12 kHz. The numbered points in the graph 500 (e.g., points 1-5) correspond to like-numbered resonant modes. For example, the point 1 corresponds to the first resonant mode, at a frequency of approximately 600 Hz; the point 2 corresponds to the second resonant mode, at a frequency of approximately 1.9 kHz; the point 3 corresponds to the third resonant mode, at a frequency of approximately 4.2 kHz; the point 4 corresponds to the fourth resonant mode, at a frequency of approximately 5.6 kHz; and the point 5 corresponds to the fifth resonant mode, at a frequency of approximately 7.9 kHz.

The frequency response 502 is for a conventional bender bar transducer that has a piezoelectric element on either side of its substrate, but does not have physically separate piezoelectric elements on either side of its substrate. The frequency response 504 is for a bender bar transducer that has physically separate piezoelectric elements on either side of its substrate, such as the bender bar transducer 200 described above. Irrespective of the polarity of the piezoelectric elements of the bender bar transducer 200, the frequency response 504 is enhanced particularly at the asymmetric resonant modes (e.g., points 2 and 4) relative to the frequency response 502. At the same time, the frequency response 504 is suppressed at symmetric resonant modes such as points 1 and 3, and has an overall flatter response across the frequency range. Accordingly, the bender bar transducer 200 provides additional acoustic energy at a frequency range of interest (e.g., 1.5 kHz-3 kHz) induced by the enhanced asymmetric resonant modes, which otherwise cannot be achieved using a conventional design.

Figure 6:
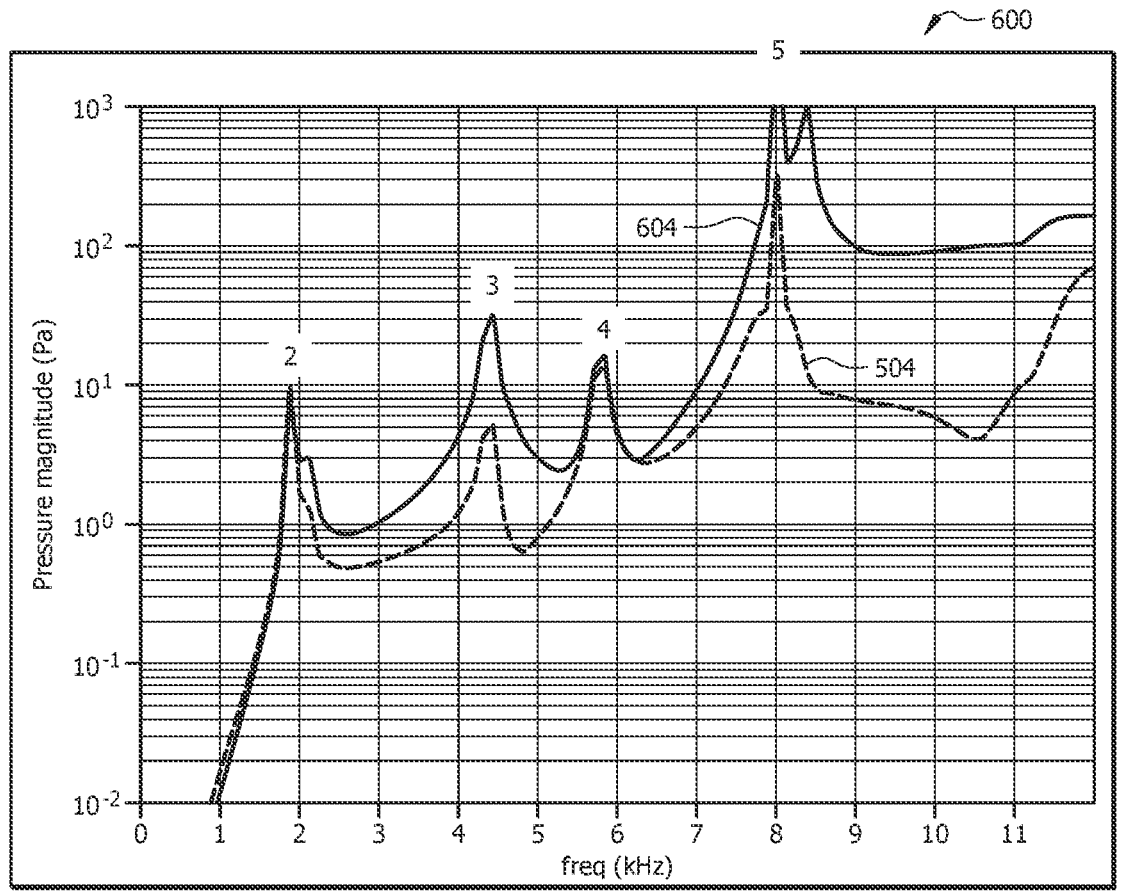
FIG. 6 is another graph of a frequency response of a bender bar transducer having physically separate piezoelectric elements, having different polarities, and responsive to receiving a same voltage signal, according to embodiments of the present disclosure.

FIG. 6 is another graph 600 that compares the frequency response 504, from FIG. 5, with a frequency response (604) of the bender bar transducer 200 having physically separate piezoelectric elements on either side of the substrate, having different polarities, and responsive to receiving a same voltage signal, according to embodiments of the present disclosure. The frequency responses 504, 604 shown in the graph 600 are shown in units of Pascals (Pa) as a function of frequency, ranging from approximately 500 hertz (Hz) to 12 kHz. The numbered points in the graph 600 (e.g., points 2-5) correspond to like-numbered resonant modes, described above with respect to FIG. 5.

The frequency response 604 is for a bender bar transducer that has physically separate piezoelectric elements on either side of its substrate, such as the bender bar transducer 200 described above. Additionally, the frequency response 604 represents the response for the bender bar transducer 200 in which piezoelectric elements on a same side of the substrate 210 have different polarities. For example, as shown in FIG. 3, on a first side of the substrate 210, the first piezoelectric element 202 is polarized in a first direction (e.g., has a first polarity) away from the substrate 210, shown by arrow 302. Also on the first side of the substrate 210, the second piezoelectric element 204 is polarized in a second direction (e.g., has a second polarity) toward the substrate 210, shown by arrow 304. On the other side of the substrate 210, the third piezoelectric element 206 is polarized in a third direction (e.g., has a third polarity) toward the substrate 210, shown by arrow 306. Also on the other side of the substrate 210, the fourth piezoelectric element 208 is polarized in a fourth direction (e.g., has a fourth polarity) away from the substrate 210, shown by arrow 308.

The frequency response 604 shows that the bender bar transducer 200 modified to have physically separate piezoelectric elements on either side of its substrate maintains the already-improved sound pressure magnitude at those asymmetric resonant modes (e.g., points 2 and 4), relative to the frequency response 504. The frequency response 604 is additionally enhanced at symmetric resonant modes (e.g., points 3 and 5) relative to the frequency response 504, which results in a greater overall acoustic energy provided by the bender bar transducer 200 described herein. As explained above, by providing piezoelectric elements on a same side of the substrate 210, but having different polarities, asymmetric modes are largely enhanced, and certain symmetric modes (e.g., the third and fifth resonant modes) can still maintain acceptably good magnitudes, in response to the piezoelectric elements receiving a same voltage signal.

FIGS. 7A-7D are diagrams illustrating various electrode and/or constraining layer configurations of bender bar transducers 200 according to embodiments of the present disclosure. In each of FIGS. 7A-7D, the substrate 210 is shown with first and second piezoelectric elements 202, 204 on a first side of the substrate 210, and third and fourth piezoelectric elements 206, 208 on a second side of the substrate 210. As described above, the first and second piezoelectric elements 202, 204 have different polarities, while the third and fourth piezoelectric elements 206, 208 have different polarities. In FIGS. 7A-7D, electrodes E1-E4 are shown in various configurations, but function as described above with respect to FIGS. 2 and 3.

In FIGS. 7B and 7C, the bender bar transducer 200 is shown in configurations that include constraining layers 702, 704, 706, 708. The constraining layers 702, 704, 706, 708 are additional material deposited on the outer surfaces of the piezoelectric elements 202, 204, 206, 208 and may function to dampen or "smooth out" the peaks in frequency response of the bender bar transducer 200 near the resonant modes, such as those shown in FIG. 6. The constraining layers 702, 704, 706, 708 can be conductive or insulative material and, in one particular example, are aluminum. The constraining layers 702, 704, 706, 708 have a thickness of at least five percent of a thickness of the piezoelectric elements 202, 204, 206, 208, respectively, in order to provide sufficient rigidity to constrain the movement of those piezoelectric elements 202, 204, 206, 208. In the examples of FIGS. 7A-7D, the piezoelectric elements 202, 204, 206, 208 have a thickness of approximately 3 millimeters (mm), a depth of 20 mm, and a width of 35 mm.

The configuration of the bender bar transducer 200 in FIG. 7A is similar to that described above in FIG. 3.

The configuration of the bender bar transducer 200 in FIG. 7B includes constraining layers 702, 704, 706, 708 on the outer surfaces of the electrodes E1, E2, E3, E4, respectively. For example, the electrode E1 is coupled to an outer surface of the piezoelectric element 202, and the constraining layer 702 is coupled to an outer surface of the electrode E1. Continuing this example, the electrode E2 is coupled to an outer surface of the piezoelectric element 204, and the constraining layer 704 is coupled to an outer surface of the electrode E2. The electrode E3 is coupled to an outer surface of the piezoelectric element 206, and the constraining layer 706 is coupled to an outer surface of the electrode E3. Finally, the electrode E4 is coupled to an outer surface of the piezoelectric element 208, and the constraining layer 708 is coupled to an outer surface of the electrode E4.

The configuration of the bender bar transducer 200 in FIG. 7C includes constraining layers 702, 704, 706, 708 between the outer surface of the piezoelectric elements 202, 204, 206, 208 and the electrodes E1, E2, E3, E4, respectively. For example, the constraining layer 702 is coupled to an outer surface of the piezoelectric element 202, and the electrode E1 is coupled to an outer surface of the constraining layer 702. Continuing this example, the constraining layer 704 is coupled to an outer surface of the piezoelectric element 204, and the electrode E2 is coupled to an outer surface of the constraining layer 704. The constraining layer 706 is coupled to an outer surface of the piezoelectric element 206, and the electrode E3 is coupled to an outer surface of the constraining layer 706. Finally, the constraining layer 708 is coupled to an outer surface of the piezoelectric element 208, and the electrode E4 is coupled to an outer surface of the constraining layer 708.

The configuration of the bender bar transducer 200 in FIG. 7D includes electrodes E1, E2, E3, E4 that have a greater thickness and thus function as constraining layers themselves. For example, each electrode E1, E2, E3, E4 is a monolithic structure that has a thickness of at least five percent of a thickness of the piezoelectric elements 202, 204, 206, 208, respectively.

Figure 8:
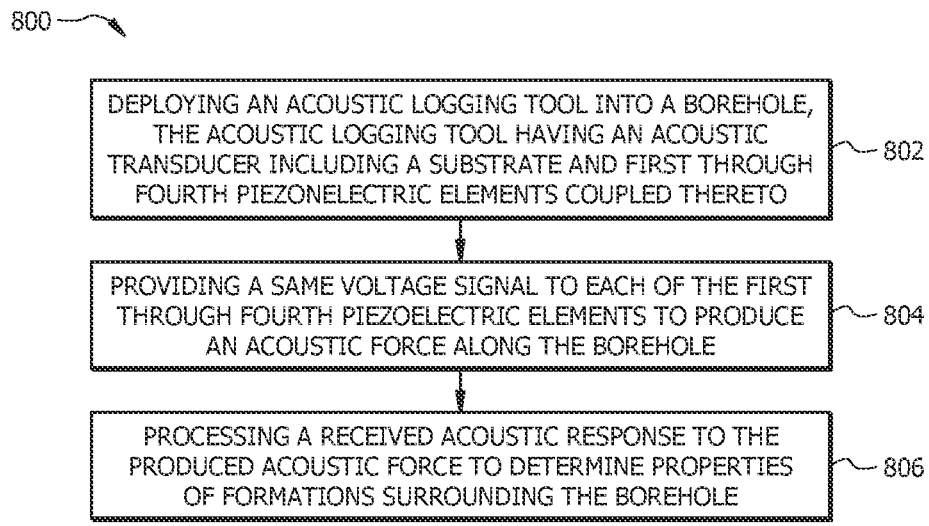
FIG. 8 is a flow chart of a method for exciting a bender bar transducer according to the present disclosure.

FIG. 8 is a flow chart of a method 800 for exciting a bender bar transducer according to the present disclosure. The method 800 begins in block 802 with deploying the acoustic logging tool into the borehole. The acoustic logging tool has an acoustic transducer including a substrate and first through fourth piezoelectric elements coupled thereto. For example, the first and second piezoelectric elements 202, 204 are coupled to the first side of the substrate 210, and the third and fourth piezoelectric elements 206, 208 are coupled to the second side of the substrate 210. The first and second piezoelectric elements 202, 204 have different polarities, and the third and fourth piezoelectric elements 206, 208 also have different polarities.

The method 800 continues in block 804 with providing a same voltage signal (e.g., an AC voltage signal V) to each of the first through fourth piezoelectric elements to produce an acoustic force along the borehole. In some examples, providing the AC voltage signal V vibrates the acoustic transducer at a resonant mode that is asymmetric with respect to a central plane that passes between the first and second piezoelectric elements 202, 204, and that passes between the third and fourth piezoelectric elements 206, 208.

The method 800 then continues in block 806 with processing a received acoustic response to the produced acoustic force to determine properties of formations surrounding the borehole. As explained above, by providing piezoelectric elements on a same side of the substrate 210, but having different polarities, asymmetric modes are largely enhanced, and certain symmetric modes (e.g., the third and fifth resonant modes) can still maintain acceptably good magnitudes, in response to the piezoelectric elements receiving a same voltage signal.

Additional Disclosure

The following are non-limiting, specific embodiments in accordance with the present disclosure:

A first embodiment, which is an acoustic transducer, comprising a substrate element having a first side and a second side, wherein the second side is opposite the first side, a first piezoelectric element coupled to the first side, the first piezoelectric element having a first polarity, a second piezoelectric element coupled to the first side, the second piezoelectric element having a second polarity, wherein the second polarity is different than the first polarity, a third piezoelectric element coupled to the second side, the third piezoelectric element having a third polarity, and a fourth piezoelectric element coupled to the second side, the fourth piezoelectric element having a fourth polarity, wherein the fourth polarity is different than the third polarity.

A second embodiment, which is the acoustic transducer of the first embodiment, further comprising a first electrode coupled to an outer surface of the first piezoelectric element, a second electrode coupled to an outer surface of the second piezoelectric element, a third electrode coupled to an outer surface of the third piezoelectric element, and a fourth electrode coupled to an outer surface of the fourth piezoelectric element.

A third embodiment, which is the acoustic transducer of the second embodiment, further comprising a first constraining layer between the first electrode and the outer surface of the first piezoelectric element, a second constraining layer between the second electrode and the outer surface of the second piezoelectric element, a third constraining layer between the third electrode and the outer surface of the third piezoelectric element, and a fourth constraining layer between the fourth electrode and the outer surface of the fourth piezoelectric element.

A fourth embodiment, which is the acoustic transducer of the third embodiment, wherein each of the first through fourth constraining layers has a thickness greater than five percent of a thickness of the first through fourth piezoelectric elements, respectively.

A fifth embodiment, which is the acoustic transducer of any of the second through the fourth embodiments, further comprising a first constraining layer on an outer surface of the first electrode, a second constraining layer on an outer surface of the second electrode, a third constraining layer on an outer surface of the third electrode, and a fourth constraining layer on an outer surface of the fourth electrode.

A sixth embodiment, which is the acoustic transducer of any of the second through the fifth embodiments, wherein each of the first through fourth electrodes has a thickness greater than five percent of a thickness of the first through fourth piezoelectric elements, respectively.

A seventh embodiment, which is the acoustic transducer of any of the first through the sixth embodiments, further comprising a first insulator extending completely between the first piezoelectric element and the second piezoelectric element, and a second insulator extending completely between the third piezoelectric element and the fourth piezoelectric element.

An eighth embodiment, which is the acoustic transducer of the seventh embodiment, wherein the first and second insulators comprise air gaps.

A ninth embodiment, which is the acoustic transducer of any of the first through the eighth embodiments, further comprising a voltage source coupled to the first through fourth piezoelectric elements and configured to provide an alternating voltage to each of the piezoelectric elements to vibrate the acoustic transducer at a resonant mode that is asymmetric with respect to a central plane that passes between the first and second piezoelectric elements, and that passes between the third and fourth piezoelectric elements.

A tenth embodiment, which is the acoustic transducer of any of the first through the ninth embodiments, wherein the first polarity and the fourth polarity are same polarities, and wherein the second polarity and the third polarity are same polarities.

An eleventh embodiment, which is the acoustic transducer of any of the first through the tenth embodiments, wherein a dimension of at least one of the first through fourth piezoelectric elements is different than a like dimension of another of the first through fourth piezoelectric elements.

A twelfth embodiment, which is a method utilizing an acoustic logging tool within a borehole, the method comprising deploying the acoustic logging tool into the borehole, the acoustic logging tool having an acoustic transducer including a substrate element having a first side and a second side, wherein the second side is opposite the first side, a first piezoelectric element coupled to the first side, the first piezoelectric element having a first polarity, a second piezoelectric element coupled to the first side, the second piezoelectric element having a second polarity, wherein the second polarity is different than the first polarity, a third piezoelectric element coupled to the second side, the third piezoelectric element having a third polarity, and a fourth piezoelectric element coupled to the second side, the fourth piezoelectric element having a fourth polarity, wherein the fourth polarity is different than the third polarity, providing a same voltage signal to each of the first through fourth piezoelectric elements to produce an acoustic force along the borehole, and processing a received acoustic response to the produced acoustic force to determine properties of formations surrounding the borehole.

A thirteenth embodiment, which is the method of the twelfth embodiment, wherein the acoustic transducer includes a first electrode coupled to an outer surface of the first piezoelectric element, a second electrode coupled to an outer surface of the second piezoelectric element, a third electrode coupled to an outer surface of the third piezoelectric element, and a fourth electrode coupled to an outer surface of the fourth piezoelectric element.

A fourteenth embodiment, which is the method of any of the twelfth and the thirteenth embodiments, wherein the acoustic transducer includes a first constraining layer between the first electrode and the outer surface of the first piezoelectric element, a second constraining layer between the second electrode and the outer surface of the second piezoelectric element, a third constraining layer between the third electrode and the outer surface of the third piezoelectric element, and a fourth constraining layer between the fourth electrode and the outer surface of the fourth piezoelectric element.

A fifteenth embodiment, which is the method of any of the twelfth through the fourteenth embodiments, wherein the acoustic transducer includes a first constraining layer on an outer surface of the first electrode, a second constraining layer on an outer surface of the second electrode, a third constraining layer on an outer surface of the third electrode, and a fourth constraining layer on an outer surface of the fourth electrode.

A sixteenth embodiment, which is the method of any of the twelfth through the fifteenth embodiments, further comprising providing a first insulator that extends completely between the first piezoelectric element and the second piezoelectric element, and a second insulator that extends completely between the third piezoelectric element and the fourth piezoelectric element.

A seventeenth embodiment, which is the method of the sixteenth embodiment, wherein the first and second insulators comprise air gaps.

An eighteenth embodiment, which is the method of any of the twelfth through the seventeenth embodiments, further comprising providing an alternating voltage to each of the piezoelectric elements to vibrate the acoustic transducer at a resonant mode that is asymmetric with respect to a central plane that passes between the first and second piezoelectric elements, and that passes between the third and fourth piezoelectric elements.

A nineteenth embodiment, which is the method of any of the twelfth through the eighteenth embodiments, wherein the first polarity and the fourth polarity are same polarities, and wherein the second polarity and the third polarity are same polarities.

A twentieth embodiment, which is the method of any of the twelfth through the nineteenth embodiments, wherein a dimension of at least one of the first through fourth piezoelectric elements is different than a like dimension of another of the first through fourth piezoelectric elements.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. An acoustic transducer, comprising:
a substrate element having a first side and a second side, wherein the second side is opposite the first side;
a first piezoelectric element coupled to the first side, the first piezoelectric element having a first polarity;
a second piezoelectric element coupled to the first side, the second piezoelectric element having a second polarity, wherein the second polarity is different than the first polarity;
a third piezoelectric element coupled to the second side, the third piezoelectric element having a third polarity;
a fourth piezoelectric element coupled to the second side, the fourth piezoelectric element having a fourth polarity, wherein the fourth polarity is different than the third polarity;
a first constraining layer on an outer surface of the first piezoelectric element;
a second constraining layer on an outer surface of the second piezoelectric element;
a third constraining layer on an outer surface of the third piezoelectric element; and
a fourth constraining layer on an outer surface of the fourth piezoelectric element.

2. The acoustic transducer of claim 1, further comprising:
a first electrode coupled to the outer surface of the first piezoelectric element;
a second electrode coupled to the outer surface of the second piezoelectric element;
a third electrode coupled to the outer surface of the third piezoelectric element; and
a fourth electrode coupled to the outer surface of the fourth piezoelectric element.

3. The acoustic transducer of claim 2, further wherein:
the first constraining layer is between the first electrode and the outer surface of the first piezoelectric element;
the second constraining layer is between the second electrode and the outer surface of the second piezoelectric element;
the third constraining layer is between the third electrode and the outer surface of the third piezoelectric element; and
the fourth constraining layer is between the fourth electrode and the outer surface of the fourth piezoelectric element.

4. The acoustic transducer of claim 3, wherein each of the first through fourth constraining layers has a thickness greater than five percent of a thickness of the first through fourth piezoelectric elements, respectively.

5. The acoustic transducer of claim 2, wherein each of the first through fourth electrodes has a thickness greater than five percent of a thickness of the first through fourth piezoelectric elements, respectively.

6. The acoustic transducer of claim 1, further comprising a first insulator extending completely between the first piezoelectric element and the second piezoelectric element, and a second insulator extending completely between the third piezoelectric element and the fourth piezoelectric element.

7. The acoustic transducer of claim 6, wherein the first and second insulators comprise air gaps.

8. The acoustic transducer of claim 1, further comprising a voltage source coupled to the first through fourth piezoelectric elements and configured to provide an alternating voltage to each of the piezoelectric elements to vibrate the acoustic transducer at a resonant mode that is asymmetric with respect to a central plane that passes between the first and second piezoelectric elements, and that passes between the third and fourth piezoelectric elements.

9. The acoustic transducer of claim 1, wherein the first polarity and the fourth polarity are same polarities, and wherein the second polarity and the third polarity are same polarities.

10. The acoustic transducer of claim 1, wherein each of the first through fourth constraining layers comprise conductive material.

11. The acoustic transducer of claim 1, wherein each of the first through fourth constraining layers comprise insulative material.

12. The acoustic transducer of claim 1, wherein each of the first through fourth constraining layers are made of aluminum.

13. The acoustic transducer of claim 1, wherein each of the first through fourth constraining layers are configured to smooth out peaks in frequency response of the acoustic transducer.

14. A method utilizing an acoustic logging tool within a borehole, the method comprising: deploying the acoustic logging tool into the borehole, the acoustic logging tool having an
  acoustic transducer including:
    a substrate element having a first side and a second side, wherein the second side is opposite the first side;
    a first piezoelectric element coupled to the first side, the first piezoelectric element having a first polarity;
    a second piezoelectric element coupled to the first side, the second piezoelectric element having a second polarity, wherein the second polarity is different than the first polarity;
    a third piezoelectric element coupled to the second side, the third piezoelectric element having a third polarity;
    a fourth piezoelectric element coupled to the second side, the fourth piezoelectric element having a fourth polarity, wherein the fourth polarity is different than the third polarity;
    a first constraining layer on an outer surface of the first piezoelectric element;
    a second constraining layer on an outer surface of the second piezoelectric element;
    a third constraining layer on an outer surface of the third piezoelectric element; and
    a fourth constraining layer on an outer surface of the fourth piezoelectric element;
  providing a same voltage signal to each of the first through fourth piezoelectric elements to produce an acoustic force along the borehole; and
  processing a received acoustic response to the produced acoustic force to determine properties of formations surrounding the borehole.

15. The method of claim 14, wherein the acoustic transducer includes:
  a first electrode coupled to the outer surface of the first piezoelectric element;
  a second electrode coupled to the outer surface of the second piezoelectric element;
  a third electrode coupled to the outer surface of the third piezoelectric element; and
  a fourth electrode coupled to the outer surface of the fourth piezoelectric element.

16. The method of claim 15, wherein:
  the first constraining layer is between the first electrode and the outer surface of the first piezoelectric element;
  the second constraining layer is between the second electrode and the outer surface of the second piezoelectric element;
  the third constraining layer is between the third electrode and the outer surface of the third piezoelectric element; and
  the fourth constraining layer is between the fourth electrode and the outer surface of the fourth piezoelectric element.

17. The method of claim 14, further comprising providing a first insulator that extends completely between the first piezoelectric element and the second piezoelectric element, and a second insulator that extends completely between the third piezoelectric element and the fourth piezoelectric element.

18. The method of claim 17, wherein the first and second insulators comprise air gaps.

19. The method of claim 14, further comprising providing an alternating voltage to each of the piezoelectric elements to vibrate the acoustic transducer at a resonant mode that is asymmetric with respect to a central plane that passes between the first and second piezoelectric elements, and that passes between the third and fourth piezoelectric elements.

20. The method of claim 14, wherein the first polarity and the fourth polarity are same polarities, and wherein the second polarity and the third polarity are same polarities.

* * * * *